(12) United States Patent
Kang

(10) Patent No.: US 9,915,801 B2
(45) Date of Patent: Mar. 13, 2018

(54) AUTO FOCUSING MODULE, PHOTOGRAPHING APPARATUS INCLUDING THE SAME, AND METHOD OF MANUFACTURING AUTO FOCUSING MODULE

(71) Applicant: Samsung Electronics Co., Ltd., Gyeonggi-do (KR)

(72) Inventor: Yoon-seok Kang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 74 days.

(21) Appl. No.: 15/006,483

(22) Filed: Jan. 26, 2016

(65) Prior Publication Data

US 2016/0219200 A1    Jul. 28, 2016

(30) Foreign Application Priority Data

Jan. 27, 2015  (KR) .......................... 10-2015-0012849

(51) Int. Cl.
*H04N 5/232* (2006.01)
*G03B 13/00* (2006.01)
*G02B 7/04* (2006.01)
*H04N 5/225* (2006.01)
*G03B 3/10* (2006.01)

(52) U.S. Cl.
CPC ................. *G02B 7/04* (2013.01); *G03B 3/10* (2013.01); *H04N 5/2254* (2013.01)

(58) Field of Classification Search
CPC .......... H04N 5/23209; H04N 5/23212; G03B 17/12; G03B 17/14; G03B 13/36; G03B 2205/0053; G03B 2205/0084; G02B 7/005; G02B 7/14; G02B 7/16
See application file for complete search history.

(56) References Cited

U.S. PATENT DOCUMENTS

| 7,356,252 B2 | 4/2008 | Wang | |
| 2005/0231832 A1* | 10/2005 | Aoki | G02B 7/102 359/826 |
| 2008/0024879 A1* | 1/2008 | Shih | G02B 7/102 359/698 |
| 2008/0122967 A1* | 5/2008 | Huang | G02B 7/08 348/340 |
| 2011/0149414 A1* | 6/2011 | Li | G02B 7/102 359/696 |

(Continued)

*Primary Examiner* — Kelly L Jerabek
(74) *Attorney, Agent, or Firm* — Cha & Reiter, LLC

(57) ABSTRACT

An auto focusing (AF) module includes a fixed base, an AF barrel configured to support a focus lens, an AF base supported by the fixed base and configured to support the AF barrel such that the AF barrel that moves along an optical axis. A stepper motor is fixed to the AF base and provides a driving force to the AF barrel; a bonding member is arranged between the fixed base and the AF base, the bonding member being configured to bond the fixed base and the AF base to each other. The AF module may fix the AF base in an optimum location with respect to the fixed base, so that the assembling error of a first guide shaft assembled in the AF base may be compensated. The AF module may be fixed to the optimum location with respect to another component, such as the lens frame.

14 Claims, 10 Drawing Sheets

(56) References Cited

U.S. PATENT DOCUMENTS

| | | | |
|---|---|---|---|
| 2011/0236008 A1* | 9/2011 | Kang | G03B 3/10 396/133 |
| 2012/0120511 A1* | 5/2012 | Ku | G02B 7/08 359/824 |
| 2012/0176691 A1* | 7/2012 | Hirabayashi | G02B 7/021 359/813 |
| 2012/0230665 A1* | 9/2012 | Okamoto | F03G 7/065 396/133 |
| 2013/0088791 A1* | 4/2013 | Iwasaki | G02B 7/08 359/827 |
| 2014/0118842 A1* | 5/2014 | Nakamura | G02B 7/102 359/700 |
| 2014/0153120 A1* | 6/2014 | Lin | G02B 7/38 359/823 |

* cited by examiner

AUTO FOCUSING MODULE, PHOTOGRAPHING APPARATUS INCLUDING THE SAME, AND METHOD OF MANUFACTURING AUTO FOCUSING MODULE

CLAIM OF PRIORITY

This application claims the benefit of priority from Korean Patent Application No. 10-2015-0012849, filed on Jan. 27, 2015, in the Korean Intellectual Property Office, the disclosure of which is incorporated herein in its entirety by reference.

BACKGROUND

1. Field of the Disclosure

The present disclosure relates to an auto focusing (AF) module, a photographing apparatus including the AF module, and a method of manufacturing the AF module.

2. Description of the Related Art

Photography is more popular than ever, and there has been a widespread growth in the use of devices such as digital cameras, digital video cameras, etc. Although photographic devices have improved greatly in many facets of operation, the customer demands for even higher quality still image or video capture has also increased. The additional customer demands for reduced size and power usage for such devices along with increased quality has presented a challenge to developers and manufacturers.

For example, the demand has increased for a photographic apparatuses including an auto focusing (AF) module for automatically adjusting a focus.

Driving sources for the AF module may include a stepper motor, a voice coil motor, an ultrasound motor, etc.

Among the above driving sources, the stepper motor has the shortest AF time. Also, the stepper motor may easily perform high-speed continuous shooting, and has a high expandability with respect to a video and an AF algorithm.

However, in order to realize an accurate AF in a structure using a stepper motor, there is a great deal of complexity in such a design, and great care required to avoid design errors and assembling errors.

SUMMARY

A novel and non-obvious auto focusing (AF) module including a stepper motor unit and having an excellent AF performance, a photographing apparatus including the AF module, and a method of manufacturing the AF module are disclosed herein.

Additional aspects will be set forth in part in the description which follows and, in part, will become apparent to a person of ordinary skill from the description, or may be learned by practice of the presented embodiments.

According to an embodiment of the present disclosure, an auto focusing (AF) module may include: a fixed base; an AF barrel configured to support a focus lens; an AF base supported by the fixed base and configured to support the AF barrel such that the AF barrel moves along an optical axis to adjust a focus; a stepper motor unit fixed to the AF base and providing a driving force to the AF barrel; and a bonding member arranged between the fixed base and the AF base to bond the fixed base and the AF base to each other.

The bonding member may include an ultraviolet bonding agent that is cured by ultraviolet rays.

The AF module may further include at least one first guide shaft assembled in the AF base.

A material of the at least one first guide shaft and a material of the AF base may be different from each other.

The AF module may further include at least a second guide shaft extending from the AF base.

A material of the second guide shaft and a material of the AF base may be the same as each other.

The fixed base may include at least one detachment prevention part with a structure that prevents the AF base from being detached from the fixed base, and the AF base may be arranged apart from the detachment prevention part by a predefined distance.

The AF module may further include a holder unit fixed to the AF base.

The stepper motor unit may include a stepper motor, and a lead screw configured to be rotated by the stepper motor.

The stepper motor unit may further include a pressurizing member coupled to the lead screw, and the AF barrel may further include a lead screw insertion part into which the lead screw is inserted.

According to another embodiment of the disclosure, a photographing apparatus includes the auto focusing (AF) module.

According to another embodiment of the disclosure, a method of manufacturing an auto focusing (AF) module includes: assembling in a fixed base an AF base that supports an AF barrel such that the AF barrel is movable, wherein the AF barrel is configured to support a focus lens; injecting a bonding member that is not cured, between the AF base and the fixed base; adjusting a location of the AF base with respect to the fixed base; and curing the bonding member.

The method may further include assembling at least one first guide shaft in the AF base prior to assembling the AF base in the fixed base.

The adjusting of the location of the AF base may be performed in real time, based on a resolution of an image corresponding to incident light transmitted through the focus lens.

BRIEF DESCRIPTION OF THE DRAWINGS

The above and/or other novel and non-obvious features in this disclosure will become apparent and more readily appreciated by a person of ordinary skill in the art from the following description of the embodiments, taken in conjunction with the accompanying drawings in which.

DETAILED DESCRIPTION

Figure 1:
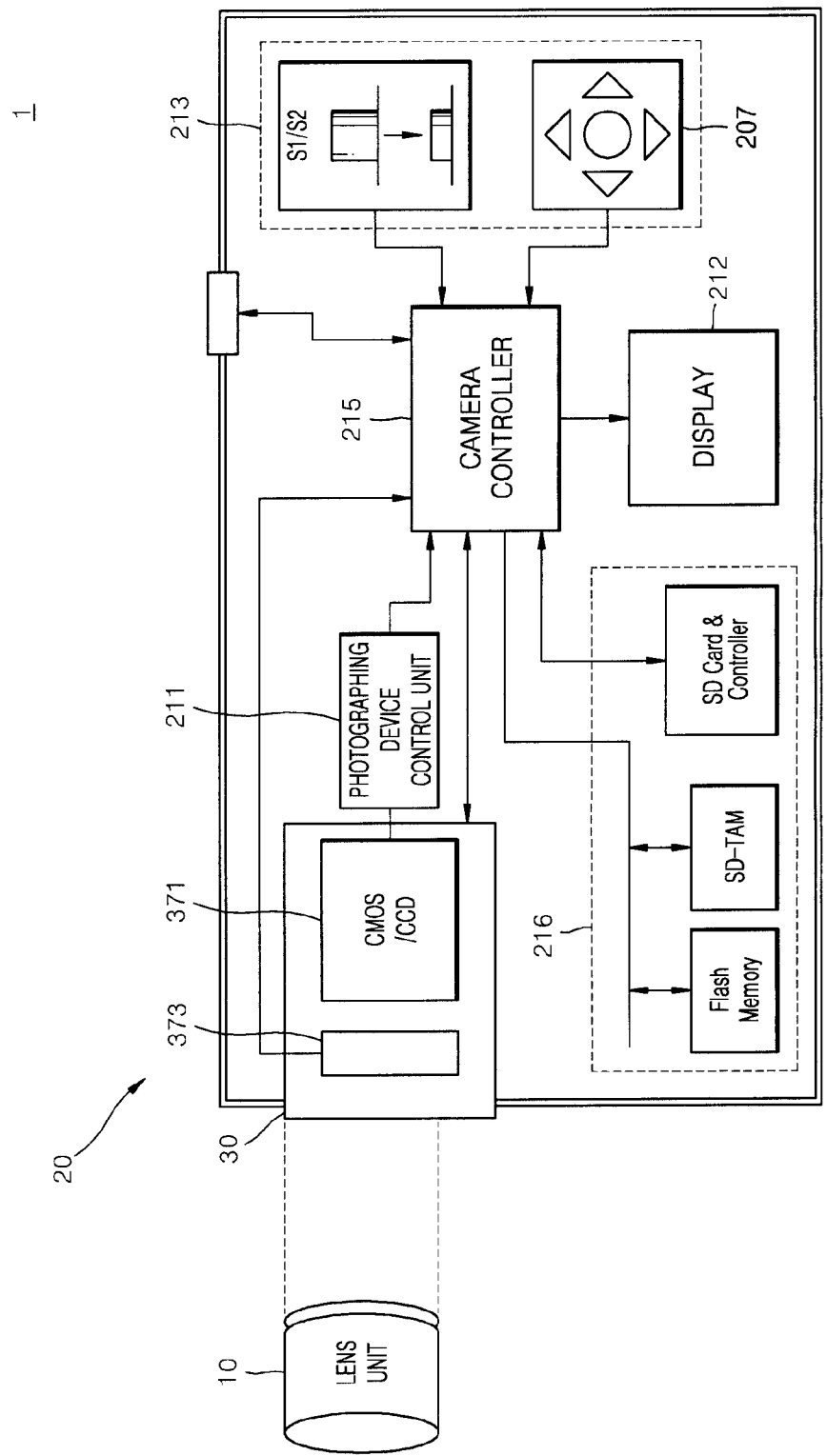
FIG. 1 a block diagram of some of the components of a photographing apparatus according to an embodiment of the disclosure.

Reference will now be made in detail to embodiments, examples of which are illustrated in the accompanying drawings. An auto focusing module and a photographing apparatus including the auto focusing module according to embodiments will be described in detail by referring to the accompanying drawings, wherein like reference numerals refer to like elements performing like operations. It should be understood that unless specified to the contrary or not physically combinable, features of one embodiment may be provided in other embodiments of the present disclosure.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer, or section and not to imply order or a fixed quantity. Thus, a first element, component, region, layer, or section discussed below could be termed a second element, component, region, layer, or section without departing from the teachings of embodiments. As used herein, the term "and/or" includes any and all combinations of one or more of the associated listed items.

The terminology used herein is provided for the purpose of describing particular embodiments only and does not limit the appended claims to the embodiments shown and described herein. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

Figure 2:
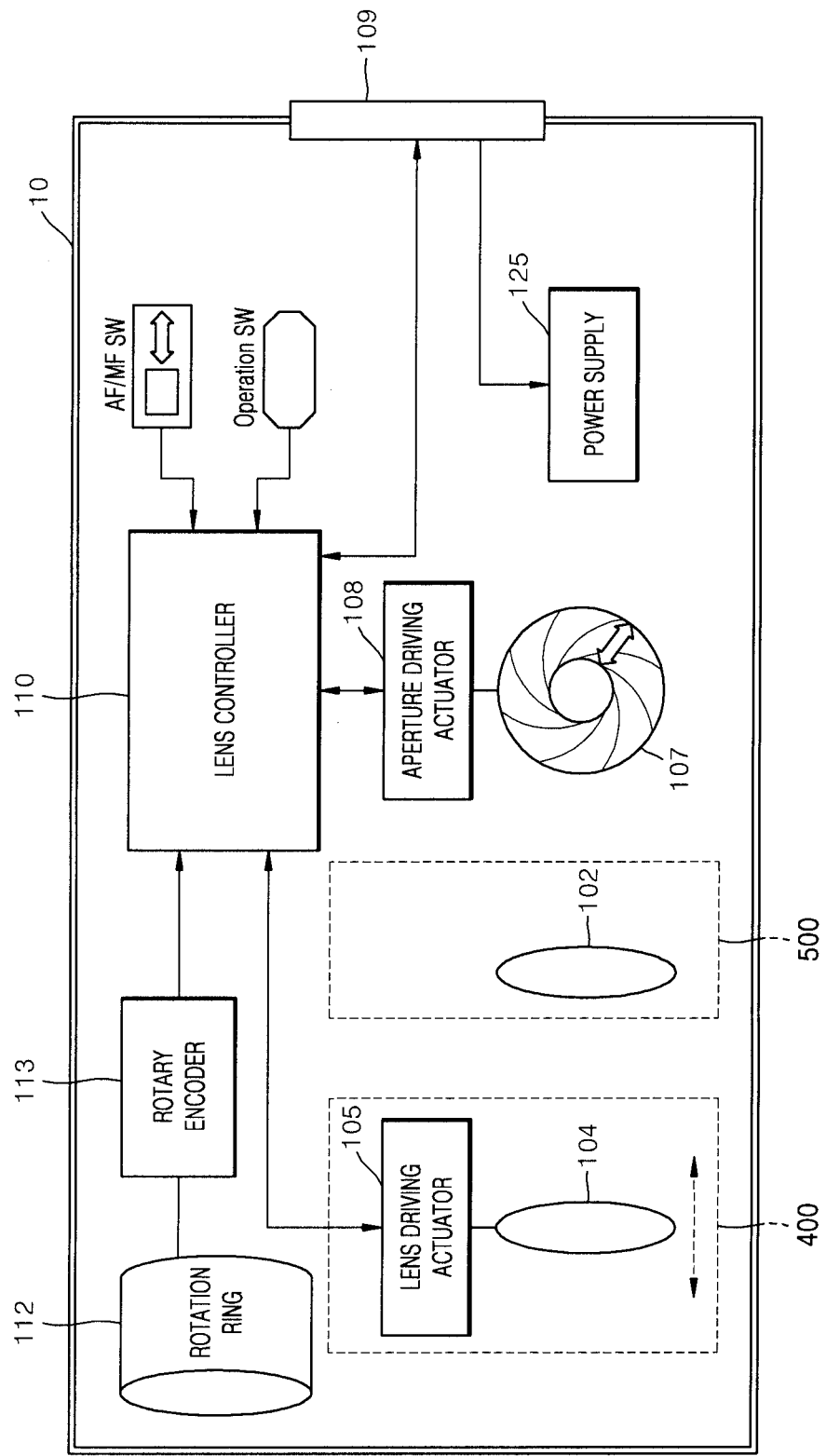
FIG. 2 is a block diagram of a lens unit of the photographing apparatus of FIG. 1.

FIG. 1 is a block diagram of components of a photographing apparatus 1 according to an embodiment, and FIG. 2 is a block diagram of components of a lens unit 10 of FIG. 1.

Referring now to FIGS. 1 and 2, the photographing apparatus 1 includes the lens unit 10 and a main body unit 20.

The lens unit 10 may provide a focus detection function to detect a focus state, and the main body unit 20 may include a function of driving a focus lens 104 of the lens unit 10 for an AF of one or more objects. When a manual focus adjustment is used, a lens 102 and the focus lens 104 may be driven by a user's manipulation.

The lens unit 10 includes the lens 102, the focus lens 104 and an aperture 107 for changing a location of a focus, a lens driving actuator 105, a rotary encoder 113, an aperture driving actuator 108, a lens controller 110, and a lens mount 109. Also, the lens 102 and the focus lens 104 may be included in a lens group in which a plurality of lenses are combined to obtain a desired focus.

In an automatic focus adjusting method, the lens driving actuator 105 and the aperture driving actuator 108 are controlled by the lens controller 110 to drive the focus lens 104 and the aperture 107, respectively. For example, the lens driving actuator 105 drives the focus lens 104 such that the focus lens 104 moves in a direction of an optical axis. A module including the focus lens 104 and the lens driving actuator 105 may be referred to as an auto focusing module 400.

Moreover, the focus lens 104 may also be manipulated by a manual manipulation of a user. The rotary encoder 113 may sense a location of the focus lens 104 according to the manual manipulation of a user. For example, a user may manually manipulate a rotation ring 112 to move the focus lens 104, and the rotary encoder 113 may detect the rotational state of the rotation ring 112 and determine the location of the focus lens 104. Here, since the configuration of moving the focus lens 104 by using the rotation ring 112 is well known to one of ordinary skill in the art, its detailed description will be omitted. Next, continued reference to FIGS. 1 and 2, the lens controller 110 determines the location of the focus lens 104, and outputs the determined location information of the focus lens 104 to the main body unit 20. Here, when there is a change in the location of the focus lens 104 or when a camera controller 215 requests the location information of the focus lens 104, the lens controller 110 may provide the determined location information of the focus lens 104 to the main body unit 20. Also, in the manual focus adjusting method, the lens controller 110 may continually or periodically determine information about a rotational state of the lens unit 10 and output the determined information to the main body unit 20.

A power supply 125 may provide power received from the main body unit 20 to the lens controller 110 and the lens driving actuator 105 and the aperture driving actuator 108.

In the above embodiment, the lens unit 10 is controlled by the lens controller 110. However, operation of the lens unit 10 it is not limited to the description above. It will be understood by one of ordinary skill in the art that the camera controller 215 (to be described, infra) may control the lens unit 10, or the lens controller 110 and the camera controller 215 may be integrally formed.

The lens mount 109 includes one or more contact points (not shown), which couples with one or more contact points (not shown) provided in the main body unit 20 to provide a conducting path for sending and receiving power, data, control signals, etc., with the main body.

According to an embodiment, the main body unit 20 may include a lens mounting module 30, a photographing device controller 211, a display 212, a manipulation key 213, and the camera controller 215.

The lens mounting module 30 is a component in which the lens unit 10 is mounted, and the lens mounting module 30 includes one more electrical contact points (not shown) of the lens unit 10. The lens mounting module 30 includes other hardware such as an image sensor 371 and a shutter 373.

The image sensor 371 senses light that has passed through a focusing optical system of the lens unit 10 and generates an image signal. The image sensor 371 may include a plurality of photoelectric transducers arranged in a matrix, and vertical and/or horizontal transmission paths via which charges move from the photoelectric transducers so that image signals are read. The image sensor 371 may include a charge coupled device (CCD) sensor, a complementary metal oxide semiconductor (CMOS) sensor, etc.

The shutter 373 is controlled by signal or by a subprocessor or controller that determines a time in which light is to be applied to the image sensor 371 to obtain an image. In other words, a time in which the image sensor 371 is exposed to light.

The photographing device controller 211 generates timing signals and controls the image sensor 371 to photograph an image in synchronization with the timing signals. Also, the photographing device controller 211 controls image signals of a horizontal direction to be sequentially read, after charge accumulation is completed in each of scan lines. The read image signals of the horizontal direction are used by the camera controller 215 to detect a focus.

The display 212 displays various images and information. The display 212 may include an organic light-emitting device (OLED), etc. Also, a liquid crystal display (LCD) may also be used as the display unit 212. A touch panel may be mounted in a surface cover of the display 212 so that a location touch may be input while an image is displayed.

The manipulation key 213 is configured to receive an input of various commands from a user to manipulate the lens exchangeable photographing apparatus 1. The manipulation key 213 may include a shutter-release button, a main switch, a mode dial, a menu button, etc.

The camera controller 215 performs focus detection with respect to the image signal generated by the image sensor 371 and calculates an evaluation value of the focus detection. Also, the camera controller 215 retains the evaluation value of the focus detection at a focus detection timing according to the timing signal generated by the photographing device controller 211, and calculates a focus location by using the retained evaluation value of the focus detection.

The lens mounting module 30 may send (output) a result of calculating the focus location to the lens unit 10 via one or more contact points (not shown) of the lens mount 109, which is electrically connected to at least one of the one or more contact points of the lens unit 10.

Figure 3:
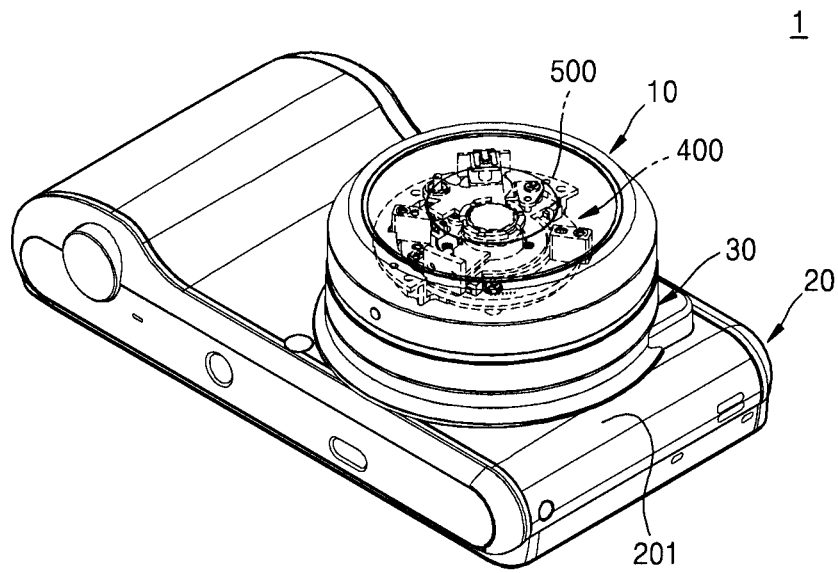
FIG. 3 and FIG. 4 are perspective views of a photographing apparatus according to an embodiment.
Figure 4:
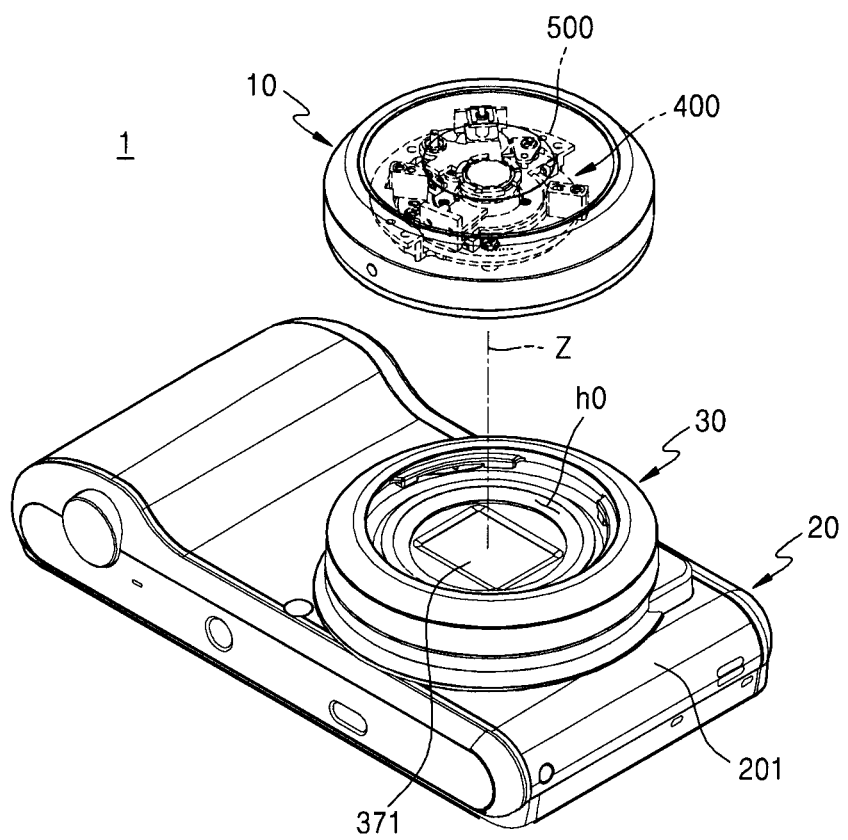

FIGS. 3 and 4 are perspective views of the photographing apparatus 1 according to an embodiment. FIG. 3 illustrates a state in which the lens unit 10 is mounted in the main body unit 20, and FIG. 4 illustrates a state in which the lens unit 10 is detached from the main body unit 20.

The lens unit 10 may include the auto focusing module 400 such as described in FIG. 2. The auto focusing module 400 may include the focus lens 104 and the lens driving actuator 105. The auto focusing module 400 may be fixed by a lens frame 500.

Although they are not illustrated, the lens unit 10 may further include the aperture 107, the rotary encoder 113, the aperture driving actuator 108, the lens controller 110, and the lens mount 109 such as shown in FIG. 2.

The main body unit 20 includes a case 201 and the lens mounting module 30. The case 201 may form an exterior portion of the photographing apparatus 1, and the manipulation key 207 for receiving an input of various commands from a user, and a display unit (not shown) for displaying various images and information may be arranged outside the main body unit 20. As shown in FIG. 4, the case 201 includes an opening "h0" corresponding to the lens mounting module 30, and the lens unit 10 may be mounted in the lens mounting module 30 via the opening h0.

The user may insert an end of the lens unit 10 into the opening h0, toward the lens mounting module 30, and rotate the end of the lens unit 10 in a predetermined direction, for example, a clockwise or a counter-clockwise direction, in order to fix the lens unit 10 in the lens mounting module 30 so that the lens unit 10 is mounted in the main body unit 20.

In this case, the auto focusing module 400 of the lens unit 10 and the image sensor 371 may be arranged along an optical axis Z.

Figure 5:
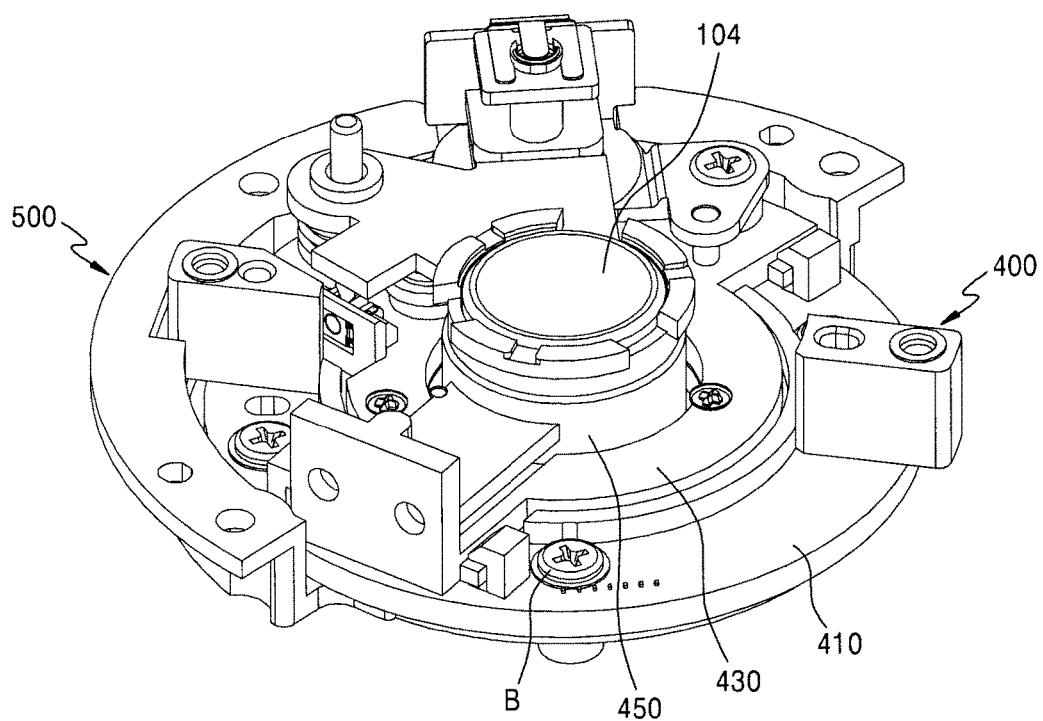
FIG. 5 is a view showing an assembled auto focusing (AF) module and a lens frame supporting the auto focusing module, according to an embodiment.
Figure 6:
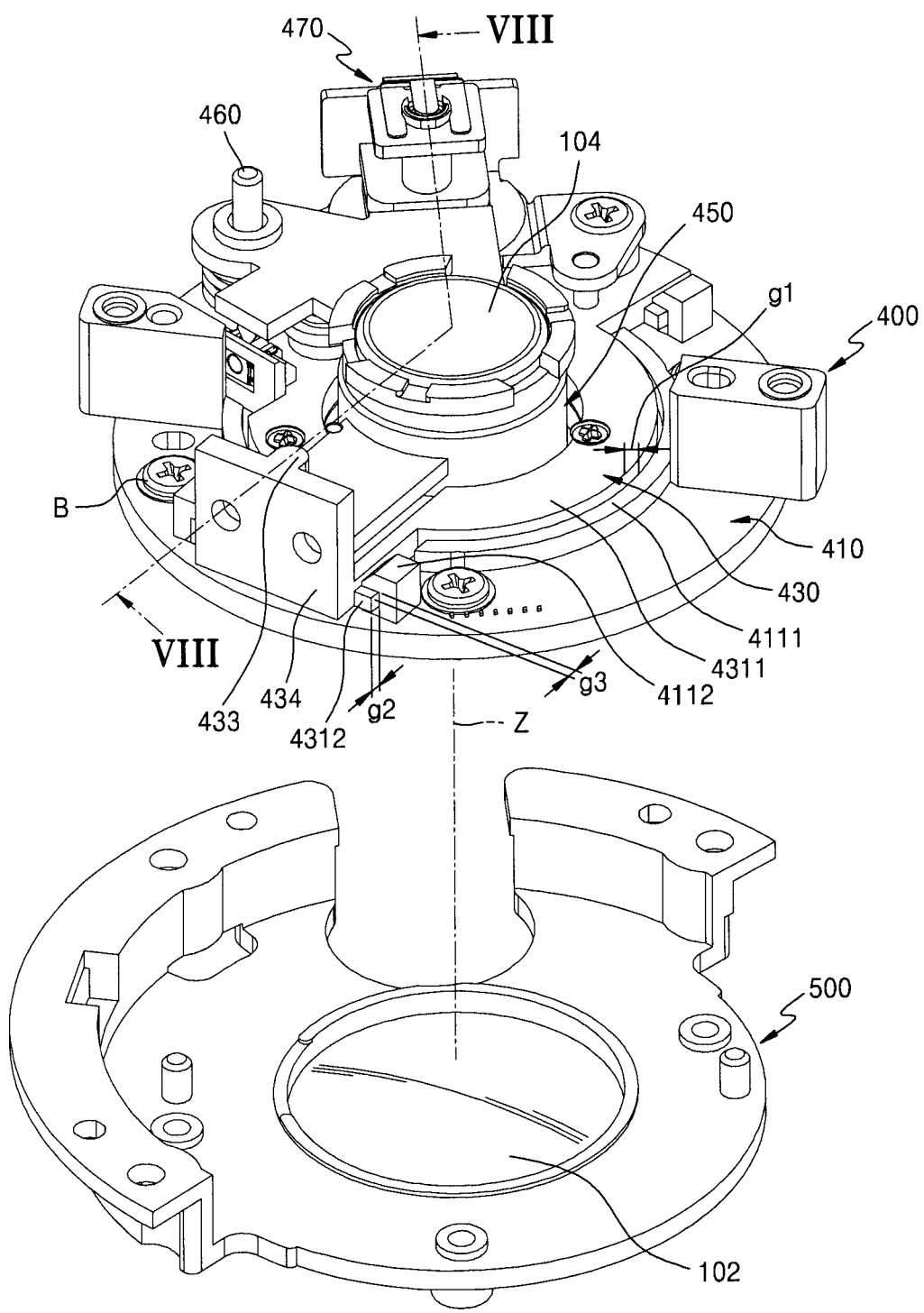
FIG. 6 is an exploded view of an AF module and a lens frame supporting the AF module, according to an embodiment.
Figure 7:
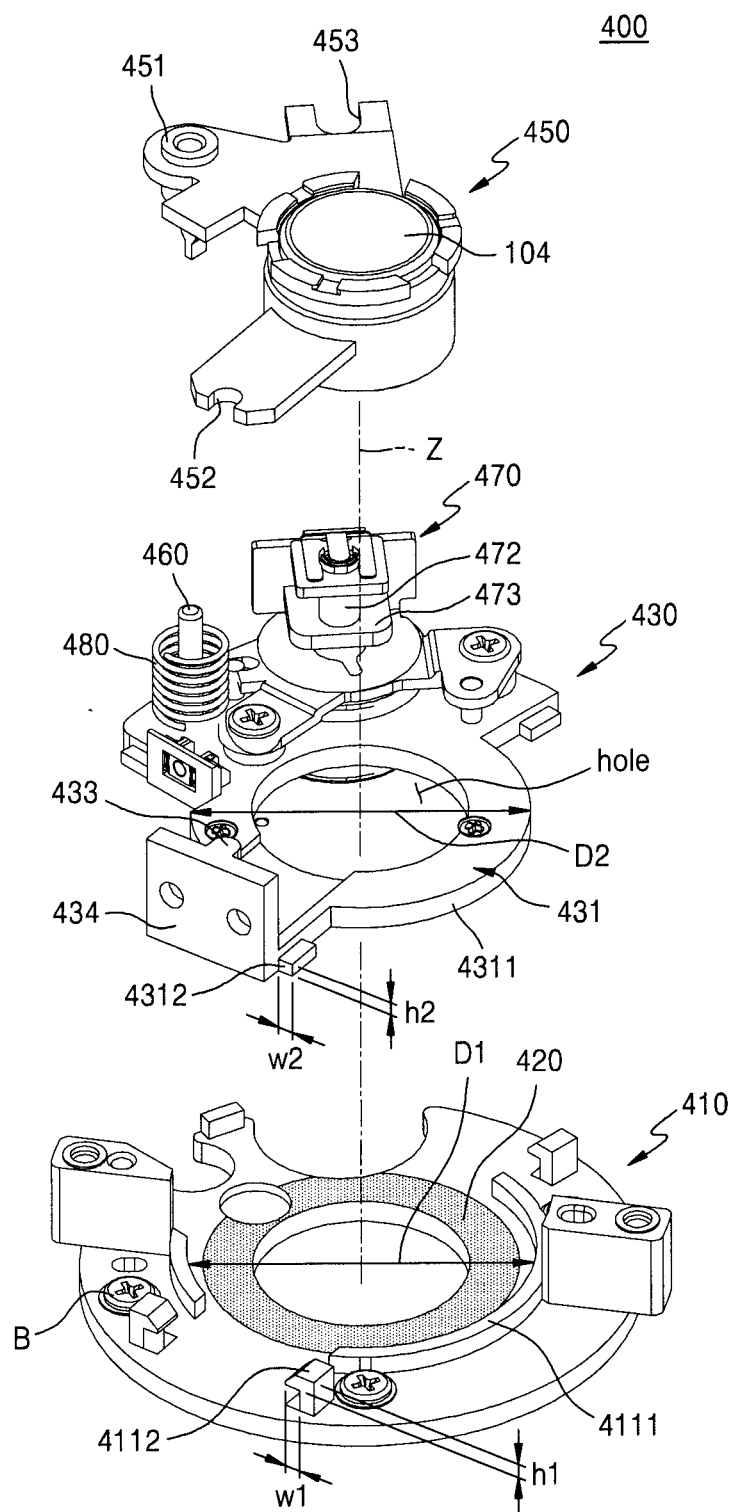
FIG. 7 is an exploded view of an AF module according to an embodiment.

FIG. 5 is a view of an assembly of the auto focusing module 400 and the lens frame 500 configured to support the auto focusing module 400, according to an embodiment. FIG. 6 is an exploded perspective view of the auto focusing module 400 and the lens frame 500 configured to support the auto focusing module 400. FIG. 7 is an exploded perspective view of the auto focusing module 400.

Referring now to FIGS. 5 and 6, the auto focusing module 400 may be supported by other components. For example, the auto focusing module 400 may be supported by the lens frame 500 arranged inside the lens unit 10 (refer to FIG. 4) and configured to support the lens 102.

Referring now to FIG. 7, the auto focusing module 400 includes a fixed base 410, an auto focusing base 430 (hereinafter, referred to as an AF base 430) supported by the fixed base 410, and an auto focusing barrel 450 (hereinafter, referred to as an AF barrel 450) supported to be move along the optical axis Z with respect to the AF base 430.

The fixed base 410 may be fixed to other components. For example, the fixed base 410 may be fixed to the lens frame 500. Thus, a positional relationship of the fixed base 410 and the lens 102 of the lens frame 500 may be fixed.

The fixed base 410 and the lens frame 500 may be fixed to each other via a fastening member B, for example, a bolt. However, the fixed structure of the fixed base 400 and the lens frame 500 is not limited thereto, and may include various structures that fix the positional relationship of the fixed base 410 and the lens frame 500.

Figure 8:
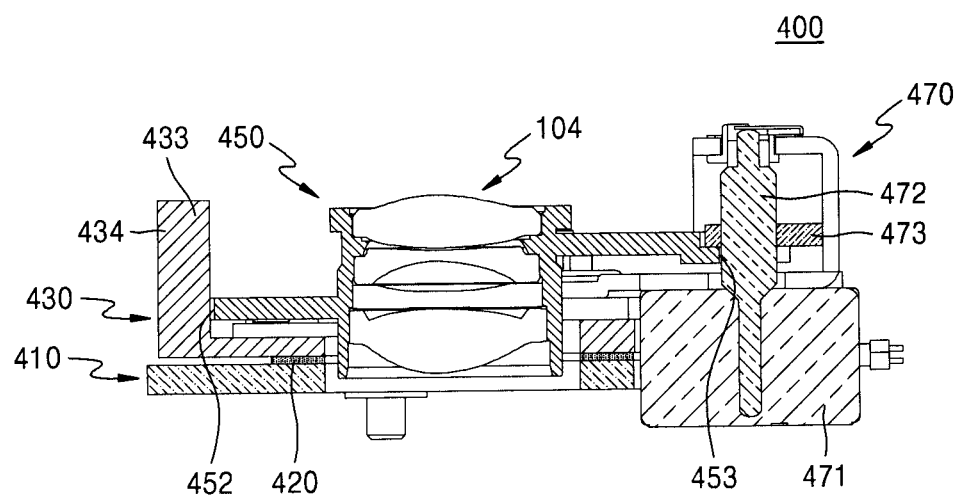
FIG. 8 is a cross-sectional view of the AF module and lens frame taken along a line VIII-VIII of the AF module of FIG. 6.

FIG. 8 is a cross-sectional view of the auto focusing module 400 of FIG. 6, which is taken along line VIII-VIII. Referring now to FIG. 8, a bonding member 420 is disposed between the fixed base 410 and the AF base 430, and the fixed base 410 and the AF base 430 are fixed via the bonding member 420. The bonding member 420 may be a type that includes an ultraviolet bonding agent cured by ultraviolet rays.

Referring now to FIGS. 6 and 7 again, the fixed base 410 has a structure whereby a portion of the AF base 430 is inserted into and assembled in the fixed base 410. For example, the fixed base 410 includes at least one detachment prevention part configured to prevent the AF base 430 from being detached from the fixed base 410. For example, the fixed base 410 may include a first detachment prevention part 4111 and a second detachment prevention part 4112.

The first detachment prevention part 4111 is arranged apart from the AF base 430 at the outside of the AF base 430, and the second detachment prevention part 4112 is arranged apart from the AF base 430 at an upper portion of the AF base 430. The AF base 430 may include a first insertion part 4311 and a second insertion part 4312 inserted into the first and second detachment prevention parts 4111 and 4112, respectively.

As shown in FIG. 7, the first detachment prevention part 4111 and the first insertion part 4311 may be arranged apart from each other. An internal diameter D1 of the first detachment prevention part 4111 may be greater than an external diameter D2 of the first insertion part 4311. Accordingly, a predetermined distance g1 may be formed between the first detachment prevention part 4111 and the first insertion part 4311. The predetermined distance g1 may be less than about 1 mm.

The second detachment prevention part 4112 and the second insertion part 4312 may be arranged apart from each other. A height "h1" or a width "w1" of an internal surface of the second detachment prevention part 4112 may be greater than a height "h2" or a width "w2" of the second insertion part 4312. For example, the height h1 of the internal surface of the second detachment prevention part 4112 may be greater than the height h2 of the second insertion part 4312, and the width w1 of the internal surface of the second detachment prevention part 4112 may be greater than the width w2 of the second insertion part 4312. Accordingly, predetermined distances "g2" and "g3" are formed between the internal surface of the second detachment prevention part 4112 and the second insertion part 4312. The predetermined distances "g2" and "g3" may be less than about 1 mm.

As shown above, the fixed base 410 and the AF base 430 are assembled to have the predetermined distances g1, g2, and g3. Accordingly, before the fixed base 410 and the AF base 430 are fixed to each other via the bonding member 420, the AF base 430 may move with respect to the fixed base 410 within a predetermined range, without being separated from the fixed base 410.

The AF base 430 is configured to support the AF barrel 450 such that the AF barrel 450 can move along the optical axis Z. The AF base 430 includes an AF body unit 431 having a via hole, through which a portion of the AF barrel 450 penetrates, and a plurality of guide shafts fixed to the AF body unit 431 and arranged in parallel to a direction of the optical axis Z. The plurality of guide shafts may include a first guide shaft 460 and a second guide shaft 433. A holder unit 434 may be fixed to the AF base 430. The holder unit 434 may extend from the second guide shaft 433. Also, the holder unit 434 may extend from the AF body unit 431.

A stepper motor unit 470 provides a driving force for the AF barrel 450 to move along the optical axis Z, and is fixed to the AF base 430. For example, the stepper motor unit 470 is fixed to the AF body unit 431.

The stepper motor unit 470 is configured to move the focus lens 104 and functions as the lens driving actuator 105 described above. When the stepper motor unit 470 is used as the lens driving actuator 105, the auto focusing time may be reduced, and a video and auto focusing algorithm may be easily expanded.

Figure 9A:
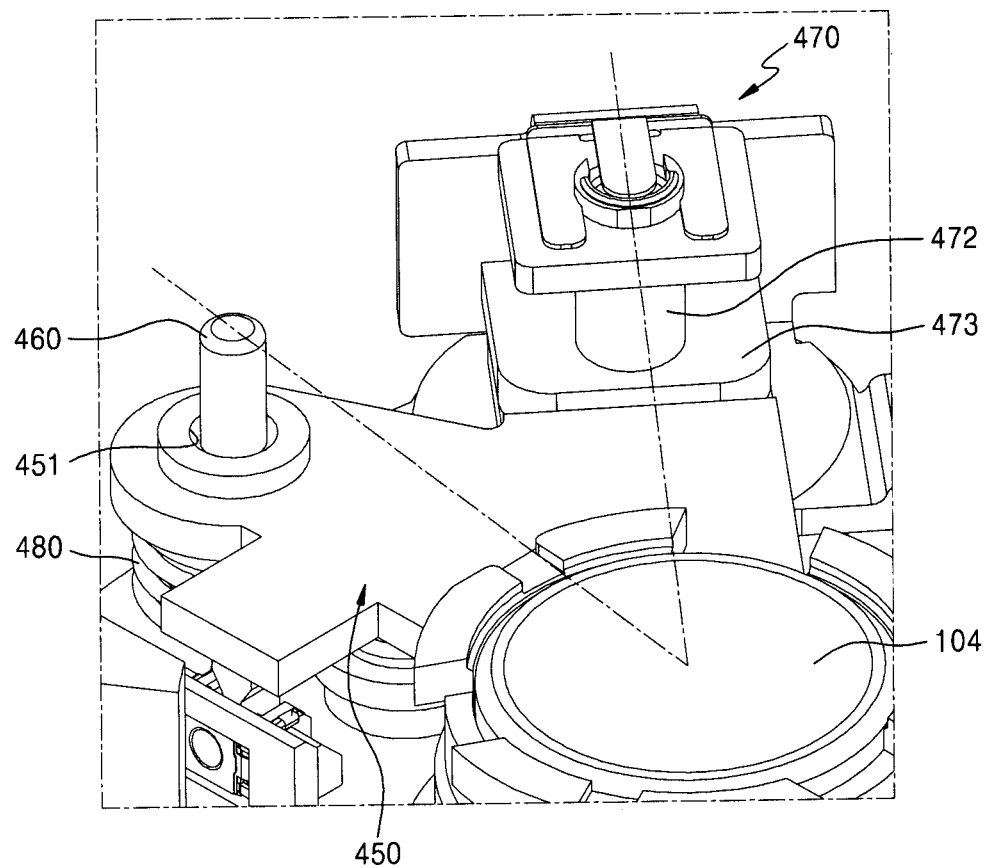
FIG. 9A is an enlarged perspective view of a portion of an AF module according to an embodiment.
Figure 9B:
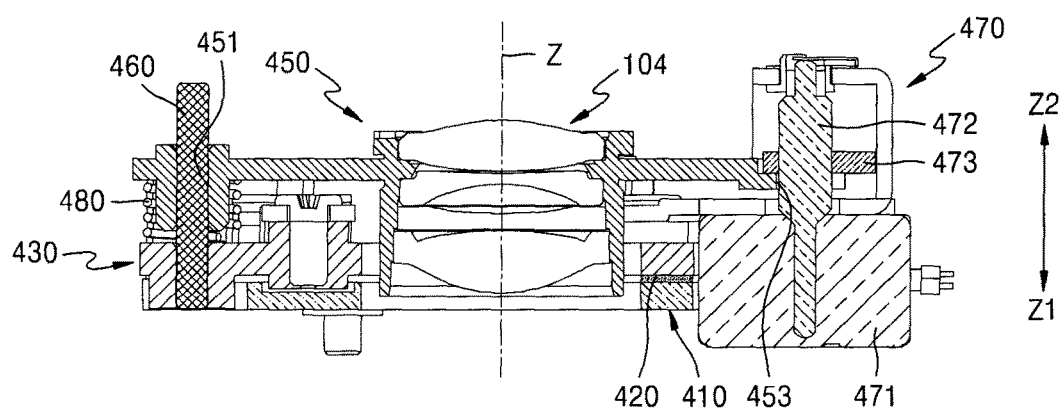
FIG. 9B is a cross-sectional view of FIG. 9A.

FIG. 9A is an enlarged perspective view of a portion of the auto focusing module 400 and FIG. 9B is a cross-sectional view of FIG. 9A. Referring now to FIGS. 9A and 9B, the stepper motor unit 470 includes a stepper motor 471 which is rotatable in a unit of a predetermined angle, and a lead screw 472 which is rotated by the stepper motor 471. The stepper motor unit 470 may further include a pressurizing member 473 coupled to the lead screw 472. When the lead screw 472 is rotated by the stepper motor 471, the pressurizing member 473 may move along the optical axis Z in a predetermined unit.

Referring now to FIGS. 7 and 9B, the AF barrel 450 may support the focus lens 104, and the AF barrel moves along the optical axis Z with respect to the AF base 430. The AF barrel 450 includes a plurality of first and second guide parts 451 and 452, into which first and second guide shafts 460 and 433 are inserted, respectively, and a lead screw insertion part 453, into which the lead screw 472 is inserted. An elastic member 480 may be arranged between the AF barrel 450 and the AF base 430.

The first guide part 451 and the second guide part 452 may have different shapes from one another. For example, the first guide part 451 may have a cylindrical shape surrounding the entire circumference of the first guide shaft 460, and the second guide part 452 may have a shape surrounding a portion of a circumference of the second guide shaft 433. With respect to the AF barrel 450 moving along the direction of the optical axis Z, the first guide shaft 460 inserted into the first guide part 451 may function as a main guide shaft, and the second guide shaft 433 inserted into the second guide part 452 may function as an auxiliary guide shaft.

When the stepper motor 471 rotates, the lead screw 472 rotates. Depending on a rotation direction of the lead screw 472, the pressurizing member 473 coupled to the lead screw 472 moves in a first direction Z1 (FIG. 9B) or a second direction Z2 which is opposite to the first direction Z1. For example, when the lead screw 472 rotates in a clockwise direction, the pressurizing member 473 moves in the first descending (retracting) direction Z1, and when the lead screw 472 rotates in a counterclockwise direction, the pressurizing member 473 moves in the second ascending (extending) direction Z2. Here, the first direction Z1 and the second direction Z2 are parallel to a length direction of the lead screw 472.

With reference to FIG. 9B, when the pressurizing member 473 moves in the first direction Z1, for example, when the pressurizing member 473 descends, the lead screw insertion part 453 of the AF barrel 450 is pressurized by the pressurizing member 473 in the first direction Z1. Accordingly, the lead screw insertion part 453 of the AF barrel 450 moves in the first direction Z1. In this case, the first guide shaft 460 is inserted into the first guide part 451, and thus, the AF barrel 450 descends along the first guide shaft 460. The second guide part 452 of the AF barrel 450 is supported by the second guide shaft 433, the AF barrel 450 is not inclined in a direction crossing the optical axis Z, and descends along the first guide shaft 460.

When the pressurizing member 473 moves in the second direction Z2, for example, when the pressurizing member 473 ascends, the pressurizing member 473 does not pressurize the lead screw insertion part 453 of the AF barrel 450. In this case, the AF barrel 450 is pressurized by the elastic member 480 in the second direction Z2. Thus, the AF barrel 450 moves in the second direction Z2. In this case, the first guide shaft 460 is inserted into the first guide part 451, and thus, the AF barrel 450 ascends along the first guide shaft 460. The second guide part 452 of the AF barrel 450 is supported by the second guide shaft 433, and thus, the AF barrel 450 is not inclined in the direction crossing the optical axis Z, and ascends along the first guide shaft 460.

Meanwhile, at least one of the plurality of guide shafts 460 and 433 fixed to the AF base 430 may include a metal material. For example, the first guide shaft 460 may include a metal material. When the first guide shaft 460 includes a metal material, a surface roughness of the first guide shaft 460 may decrease, and thus, the AF barrel 450 may smoothly move along the first guide shaft 460.

The first guide shaft 460 may be made of a different material from the AF base 430. For example, the first guide shaft 460 may be comprised of a metal material, and the AF base 430 may be comprised of a plastic material.

The second guide shaft 433 may have the same material as the AF base 430. For example, the second guide shaft 433 and the AF base 430 may have a plastic material.

The second guide shaft 433 and the AF base 430 having the same material may be simultaneously formed. For example, the second guide shaft 433 and the AF base 430 may be formed by one mold. In this case, the second guide shaft 433 may be formed to have a constant angle with respect to the AF base 430.

On the contrary, the first guide shaft 460 and the AF base 430 having different materials may be formed separately. In order to fix the first guide shaft 460 separately formed with the AF base 430 to the AF base 430, the first guide shaft 460 may be assembled in the AF base 430. For example, the first guide shaft 460 may be coupled to the AF base 430 by being inserted into the AF base 430.

In the case of the first guide shaft 460 assembled in the AF base 430 as shown above, it may be difficult to fix the first guide shaft 460 to the AF base 430 by a desired angle, because of the assembled characteristic. For example, even if the first guide shaft 460 is assembled in the AF base 430 to form a 90° angle with respect to the AF base 430, the assembled first guide shaft 460 may not form a 90° angle with respect to the AF base 430. That is, an assembling error of the first guide shaft 460 with respect to the AF base 430 may occur.

According to the present disclosure, a location of the AF base 430, in which the first guide shaft 460 is assembled, is adjusted with respect to the fixed base 410, and thus, the assembling error of the first guide shaft 460 with respect to the AF base 430 may be compensated.

If an angle of the assembled first guide shaft 460 is adjusted with respect to the AF base 430, in order to reduce the assembling error of the first guide shaft 460 with respect to the AF base 430, the first guide shaft 460 may be unintentionally bent, during the angle adjusting process. Thus, the movement of the AF barrel 450 may become inaccurate or operation errors may occur. Also, when the angle of the first guide shaft 460 is adjusted with respect to the AF base 430, specifications based on the angle of the first guide shaft 460, for example, a tilting angle of the AF barrel 450 with respect to the first guide shaft 460, a distance between the focus lens 104 of the AF barrel 450 and a lens, etc. may be changed.

However, according to the present disclosure, the location of the AF base 430 itself in which the first guide shaft 460 is assembled is adjusted with respect to the fixed base 410, rather than an angle of the first guide shaft 460 is adjusted with respect to the AF base 430, and thus, the first guide shaft 460 may be prevented from being bent, or the specifications based on the angle of the first guide shaft 460 may be prevented from being changed.

Figure 10:
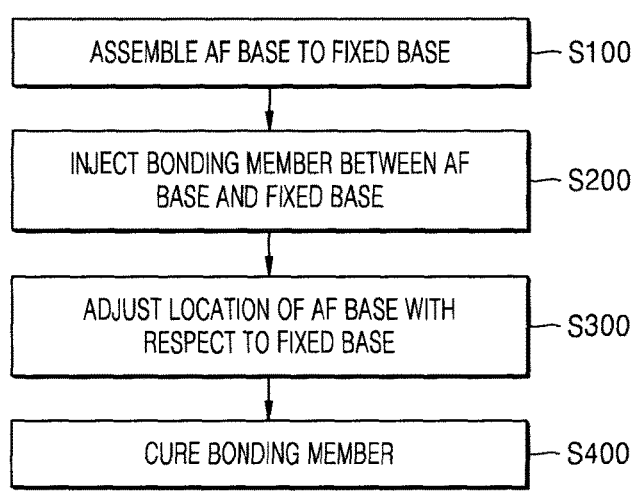
FIG. 10 is a flowchart providing an overview of a method of manufacturing an AF module, according to an embodiment.
Figure 11:
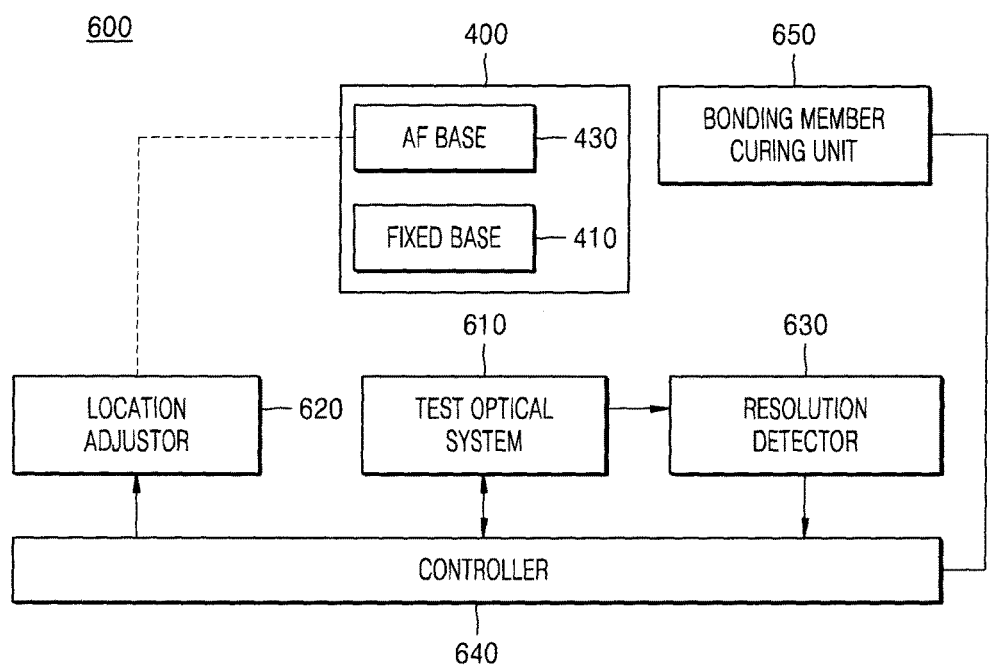
FIG. 11 is a block diagram of components of an aligning device of an AF module according to an embodiment.
Figure 12A:
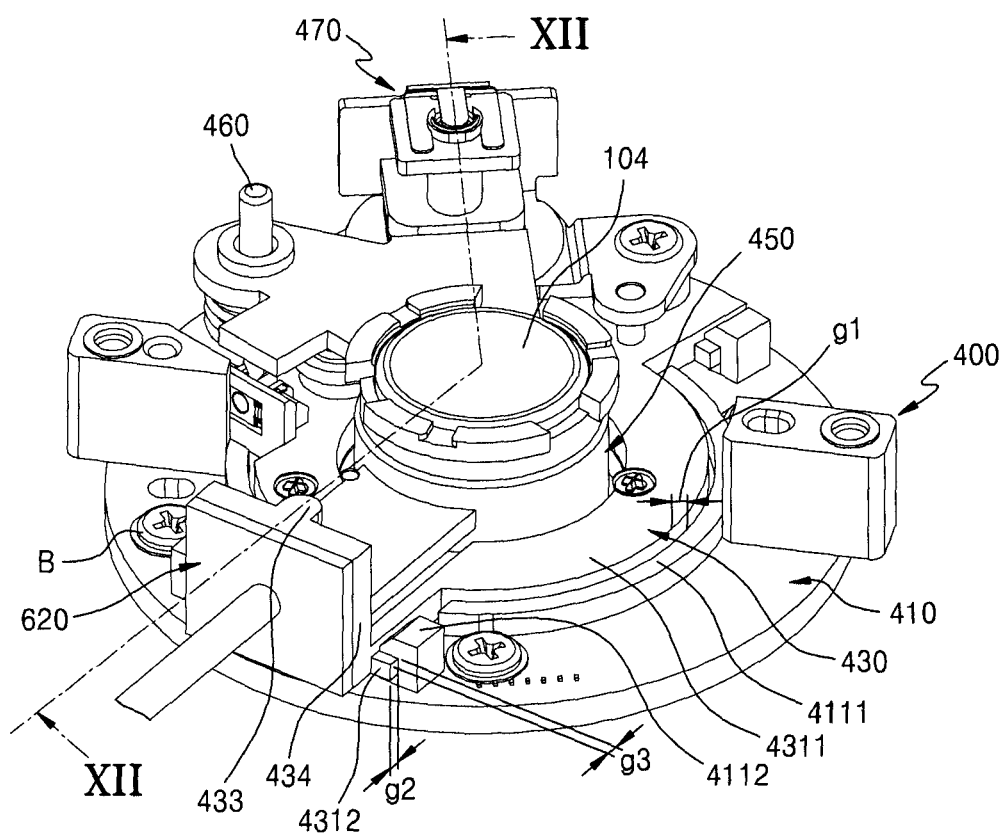
FIG. 12A and FIG. 12B are a perspective view and a cross-sectional view, respectively that illustrates adjusting of a location of an AF base in an aligning device of an AF module.
Figure 12B:
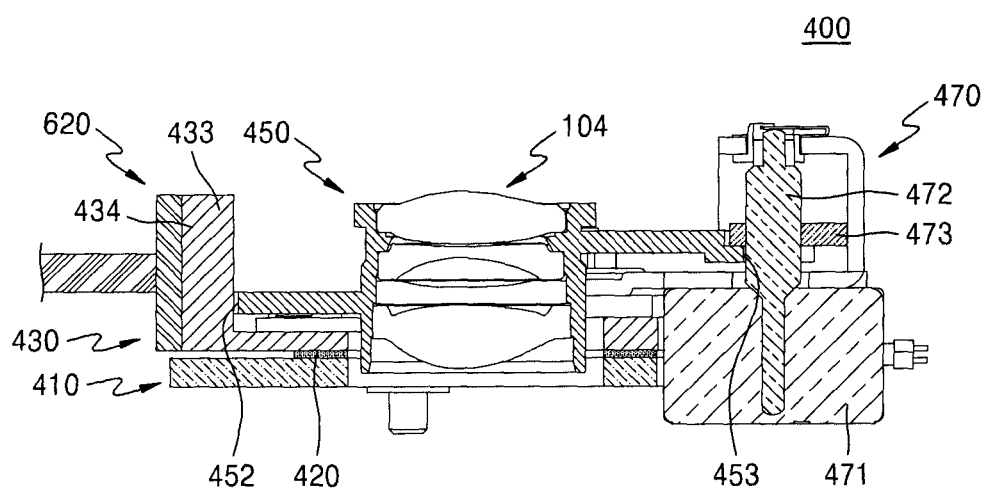

FIG. 10 is a view for describing a method of manufacturing the auto focusing module 400, according to an embodiment. FIG. 11 is a block diagram of components of an aligning device 600 of the auto focusing module 400. FIGS. 12A and 12B are respectively a perspective view and a cross-sectional view for describing a process of adjusting a location of the AF base 430 by the aligning device 600 of the auto focusing module 400. FIG. 12B is a cross-sectional view taken along line XII-XII of FIG. 12A.

Hereinafter, referring to FIGS. 10 through 12B, the process of adjusting the location of the AF base 430 of the auto focusing module 400 with respect to the fixed base 410 will be described.

Referring to FIGS. 6 and 10, In an overview, the AF base 430 in which the first guide shaft 460 is assembled is assembled in the fixed base 410, in operation S100. At S200, a bonding member is injected between the AF base and the fixed base. At S300, the location of the base is adjusted with respect to the fixed base, and at S400, the bonding member is cured.

The AF base 430 is assembled in the fixed base 410 by inserting a portion of the AF base 430 into the fixed base 410. For example, the first insertion part 4311 is inserted into the first detachment prevention part 4111 of the fixed base 410, and the second insertion part 4312 is inserted into the second detachment prevention part 4112 of the fixed base 410.

Since the predetermined distance g1 exists between the first detachment prevention part 4111 and the first insertion part 4311, and the distances g2 and g3 exist between an internal surface of the second detachment prevention part 4112 and the second insertion part 4312, the AF base 430 is allowed to move with respect to the fixed base 410, within a predetermined range.

The auto focusing module 400 including the AF base 430 assembled in the fixed base 410 is fixed to another component. For example, the auto focusing module 400 may be fixed to the lens frame 500. The fixed base 410 and the lens frame 500 may be fastened by a bolt.

Next, the auto focusing module 400 is arranged in the aligning device 600 for setting an accurate location of the AF base 430 and fixing the AF base 430 to the fixed base 410.

Referring to FIG. 11, the aligning device 600 may further include a test optical system 610, a location adjusting unit 620 configured to adjust a location of the AF base 430, a resolution detection unit 630 connected to the test optical system 610 and configured to detect a resolution of an image corresponding to incident light transmitted through the auto focus module 400, a controller 640 configured to control the location adjusting unit 620 based on the information detected by the resolution detection unit 630, and a bonding member curing unit 650 configured to cure the bonding member 420.

The auto focusing module 400 may be mounted in the test optical system 610 of the aligning device 600. The auto focusing module 400 may be mounted in the test optical system 610 by the lens frame 500. The resolution detection unit 630 of the aligning device 600 may detect a resolution of an image corresponding to incident light transmitted through the auto focus module 400.

The bonding member 420 is injected between the AF base 430 and the fixed base 410, in operation S200. The bonding member 420 includes an ultraviolet bonding agent. Here, the bonding member 420 is in a state in which the bonding member 420 is not cured by ultraviolet rays. That is, the bonding member 420 is in a non-cured state. Accordingly, the AF base 430 and the fixed base 410 are in a state in which the AF base 430 and the fixed base 410 are not fixed by being bonded to each other.

The injection of the bonding member 420 may be performed after the auto focusing module 400 is arranged in the aligning device 600. However, it is not limited thereto. For example, the bonding member 420 may be injected before the auto focusing module 400 is arranged in the aligning device 600.

Next, a location of the AF base 430 is adjusted with respect to the fixed base 410.

Referring now to FIGS. 12A and 12B, the location adjusting unit 620 of the aligning device 600 may be coupled to the holder unit 434 of the AF base 430. As described above, although the AF base 430 is assembled in the fixed base 410, the bonding member 420 is in the non-cured state and the predetermined distances g1, g2, and g3 exist between the first and second insertion parts 4311 and 4312 of the AF base 430 and the first and second detachment prevention parts 4111 and 4112 of the fixed base 410. Thus, a location of the AF base 430 may be changed within a predetermined range by the location adjusting unit 620.

The resolution detected by the test optical system 610 may be checked in real time by moving the AF base 430 by the location adjusting unit 620. Accordingly, the AF base 430 may move to a location in which an image has the optimum resolution. When the AF base 430 in which the first guide shaft 460 is assembled moves to the location in which the image has the optimum resolution, an assembling error of the first guide shaft 460 may be compensated. The location in which an image has the optimum resolution may be a location in which an image is corresponded with a reference center and reference corners.

Next, the bonding member 420 arranged between the AF base 430 and the fixed base 410 may be cured by the bonding member curing unit 650 of the aligning device 600. While the bonding member 420 is cured, the location adjusting unit 620 may maintain the AF base 430 in a location in which the image has the optimum resolution. By the curing of the bonding member 420, a positional relationship between the AF base 430 and the fixed base 410 may be fixed.

The bonding member curing unit 650 may irradiate ultraviolet rays. Thus, when the bonding member 420 includes an ultraviolet bonding agent, the bonding member 420 may be rapidly cured.

The auto focusing module 400 including the AF base 430 fixed to the fixed base 410 is separated from the aligning device 600.

By the above-described process, the auto focusing module 400 may fix the AF base 430 in the optimum location with respect to the fixed base 410. Thus, the assembling error of the first guide shaft 460 assembled in the AF base 430 may be compensated. Also, the auto focusing module 400 may be fixed to an optimum location with respect to another component, for example, the lens frame 500. By the above-described process, the location of the AF base 430 in which the first guide shaft 460 is assembled may be arranged and fixed such that the optical axis Z of the focus lens 104 of the AF barrel 450 and the optical axis Z of the lens 102 of the lens frame 500 correspond to each other, and the first guide shaft 460 is in parallel to the optical axis Z.

As described above, according to the one or more of the above embodiments, an artisan will appreciate that the auto focusing module, the photographing apparatus including the auto focusing module, and the method of manufacturing the auto focusing module provide an excellent auto focusing performance, while using the stepper motor unit as a driving source.

The words "mechanism" and "element" are used broadly and are not limited to mechanical or physical embodiments, but can include software routines in conjunction with one or more hardware processors, etc.

The particular implementations shown and described herein are illustrative examples of the present disclosure and are not intended to otherwise limit the scope of the present disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical."

The use of the terms "a" and "an" and "the" and similar referents in the context of describing the present disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or language (e.g., "such as") provided herein, is intended merely to better illuminate the present disclosure and does not pose a limitation on the scope of the present disclosure unless otherwise claimed. Numerous modifications and adaptations will be readily apparent to those of ordinary skill in this art without departing from the spirit and scope of the present disclosure.

It should be understood that embodiments described herein should be considered in a illustrative sense only and not for purposes of limitation, and aspects of one embodiment may be provided in or substituted for aspects of other embodiments of the present disclosure for purposes of the written description.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. §101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se. For example, the image processor in the present disclosure, and any references to an input unit and/or an output unit both comprise hardware circuitry configured for operation.

While one or more embodiments have been described with reference to the figures, it will be understood by those of ordinary skill in the art that various changes in form and details may be made therein without departing from the spirit and scope as defined by the following claims.

What is claimed is:

1. An auto focusing (AF) module comprising:
    a focus lens;
    an AF barrel including a structure configured to support a focus lens;
    a fixed base;
    an AF base supported by the fixed base, and having a structure that supports the AF barrel to permit movement of the AF barrel along an optical axis;
        a stepper motor unit fixed to the AF base that provides a driving force to the AF barrel for movement along the optical axis;
        a bonding member arranged between the fixed base and the AF base to bond the fixed base and the AF base to each other; and
        at least one first guide shaft assembled in the AF base to guide movement of the AF barrel along the optical axis, wherein the at least one first guide shaft and the AF base are constructed of different materials from each other.

2. The AF module of claim 1, wherein the AF base includes an AF body having a via hole, through which a portion of the AF barrel penetrates, and a plurality of guide shafts fixed to the AF body and arranged in parallel to a direction of the optical axis.

3. The AF module of claim 1, wherein the bonding member comprises an ultraviolet bonding agent cured by ultraviolet rays.

4. The AF module of claim 1, further includes at least one second guide shaft extending from the AF base.

5. The AF module of claim 4, wherein the AF base and the at least one second guide shaft are constructed of a same material.

6. The AF module of claim 1, wherein the fixed base includes at least one detachment prevention part that prevents the AF base from being detached from the fixed base, and the AF base is arranged apart from the detachment prevention part by a predetermined distance.

7. The AF module of claim 1, further comprising a holder unit fixed to the AF base.

8. The AF module of claim 1, wherein the stepper motor unit comprises a stepper motor, and a lead screw configured to be rotated by the stepper motor.

9. The AF module of claim 8, wherein the stepper motor unit further comprises a pressurizing member coupled to the lead screw, and the AF barrel further comprises a lead screw insertion part inserted into the lead screw.

10. A photographing apparatus comprising a lens unit including the auto focusing (AF) module of claim 1, and a main body including a lens mounting module, an image sensor and an aperture.

11. A method of manufacturing an auto focusing (AF) module, the method comprising:
    assembling at least one first guide shaft in an AF base to guide movement of an AF barrel along an optical axis, wherein the at least one first guide shaft and the AF base are constructed of different materials from each other;
    assembling in a fixed base the AF base configured to support the AF barrel such that the AF barrel that is movable along the optical axis, wherein the AF barrel is configured to support a focus lens;
    injecting an uncured bonding member between the AF base and the fixed base;
    adjusting a location of the AF base with respect to the fixed base; and
    curing the bonding member.

12. The method according to claim 11, further comprising providing an actuator for driving the focus lens along the optical axis.

13. The method according to claim 12, further comprising configuring the AF module to be supported by a lens frame.

14. The method of claim 11, wherein the adjusting of the location of the AF base comprises adjusting the location of the AF base in real time, based on a resolution of an image corresponding to incident light transmitted through the focus lens.

* * * * *